United States Patent
Spahr et al.

(10) Patent No.: US 9,370,968 B2
(45) Date of Patent: Jun. 21, 2016

(54) HUB

(75) Inventors: Stefan Spahr, Lengnau (CH); Martin Walthert, Aarberg (CH)

(73) Assignee: DT SWISS INC., Grand Junction, CO (US)

( * ) Notice: Subject to any disclaimer, the term of this patent is extended or adjusted under 35 U.S.C. 154(b) by 489 days.

(21) Appl. No.: 13/596,276

(22) Filed: Aug. 28, 2012

(65) Prior Publication Data

US 2013/0221732 A1    Aug. 29, 2013

(30) Foreign Application Priority Data

Aug. 30, 2011    (DE) .................. 10 2011 111 487

(51) Int. Cl.
| | |
|---|---|
| *B60B 27/02* | (2006.01) |
| *B21K 1/40* | (2006.01) |
| *B60B 27/00* | (2006.01) |
| *B60B 1/00* | (2006.01) |

(52) U.S. Cl.
CPC ............... *B60B 27/023* (2013.01); *B21K 1/40* (2013.01); *B60B 1/003* (2013.01); *B60B 27/0005* (2013.01); *B60B 27/0052* (2013.01); *B60B 2310/305* (2013.01); *B60B 2310/318* (2013.01); *B60B 2900/112* (2013.01); *B60B 2900/113* (2013.01); *B60B 2900/115* (2013.01); *B60Y 2200/12* (2013.01); *B60Y 2200/13* (2013.01); *Y10T 29/49535* (2015.01)

(58) Field of Classification Search
CPC   B60B 27/02; B60B 27/023; B60B 2310/208; B21K 1/40
USPC .............. 301/105.1, 110.5, 110.6; 29/894.36, 29/894.361, DIG. 18
See application file for complete search history.

(56) References Cited

U.S. PATENT DOCUMENTS

| | | | |
|---|---|---|---|
| 4,351,569 A | 9/1982 | Steuer et al. | |
| 4,622,731 A † | 11/1986 | Kjell | |
| 5,553,950 A * | 9/1996 | Pawsat et al. | 384/545 |
| 6,992,413 B2 † | 1/2006 | Endo | |
| 6,994,189 B2 * | 2/2006 | Chen | 188/26 |
| 7,658,450 B2 * | 2/2010 | Mercat et al. | 301/55 |
| 2001/0005098 A1 * | 6/2001 | Pont | 301/59 |
| 2011/0049966 A1 * | 3/2011 | Sartin et al. | 301/110.5 |
| 2011/0227401 A1 * | 9/2011 | Huang | 301/110.5 |

FOREIGN PATENT DOCUMENTS

| | | | |
|---|---|---|---|
| AT | 214286 | | 3/1961 |
| CN | 201538196 U | * | 8/2010 |
| DE | 1983979 | | 4/1968 |
| JP | 04328001 A | * | 11/1992 |

OTHER PUBLICATIONS

Forging Industry Association, "Forging Solutions, Design Engineering Information From FIA", 2007, pp. 1-11.*

* cited by examiner
† cited by third party

*Primary Examiner* — Kip T Kotter
(74) *Attorney, Agent, or Firm* — Greer, Burns & Crain, Ltd.

(57) ABSTRACT

A hub for two-wheeled vehicles with a hub body and method of manufacturing, wherein the hub body is rotatably supported on the axle via at least one bearing. The hub body includes a first forged component and a second forged component, wherein the first and second forged components are connected with one another through at least one sleeve and wherein both of the forged components have a plurality of fastening flanges protruding outwardly for fastening spoke units.

7 Claims, 4 Drawing Sheets

HUB

BACKGROUND

The present invention relates to a hub for at least partially muscle-powered vehicles and in particular two-wheeled vehicles having an axle and a hub body rotatably supported thereon. The invention in particular relates to a hub for a bicycle wherein the bicycle may optionally comprise electro-assistance.

Different hubs have become known in the prior art for muscle-powered vehicles such as bicycles. Significant parameters for hubs in the field of sports and for professionals are the stressability and weight. These days hubs tend to consist of a light metal or a light metal alloy or they consist at least in part of a fibrous composite material for saving weight. To further reduce the weight of light metal hubs the hub body is extensively machined mechanically, by way of turning and milling with chip removal. In this way material is removed as desired in those places where material and thus weight can be saved so as to obtain a weight-reduced while still stable structure.

These hubs operate reliably and can be low-weight. However, the advantage of the weight is achieved by extensive machining and chip-removing finishing of the hub body. This makes high-quality, lightweight hubs expensive.

SUMMARY

It is therefore the object of the present invention to provide a hub which allows a low weight and the manufacture of which is less expensive.

The present hub is provided for at least partially muscle-powered vehicles and in particular two-wheeled vehicles. It is particularly preferably employed for bicycles. These bicycles may comprise electric assistance. The hub according to the invention comprises a hub body and an axle wherein the hub body is rotatably supported on the axle via at least one bearing. The hub body comprises a first forged component and at least one second forged component, the first and the second forged components being connected through at least one sleeve. At least one forged component comprises a plurality of fastening flanges protruding outwardly for fastening spoke units.

The hub according to the invention has many advantages. One particular advantage of the hub according to the invention consists in that the hub body comprises a first and a second forged component which are connected with one another wherein fastening flanges are incorporated for fastening spoke units. In this way a lower weight is realized together with high stressability. Unlike in hubs provided with a circumferential fastening flange, according to the invention higher strength material may be provided where required while material is entirely absent between the spoke fastening points. A simple, cost effective manufacturing process for manufacturing high-strength hubs is possible. The forged external surfaces require virtually no finishing.

An advantage of the hub according to the invention is also, intentional changes to the fine structure, i.e. the crystal structure, attained in reshaping during forging. Another advantage is the minor loss of material due to which material expenditure is kept low. The first and the second forged components are in particular manufactured by die forging. Such chipless compression forming enables efficient, high-quality manufacture of die-forged components. In die-forging the forged piece is nearly entirely enclosed in a closed molding device, the die. In particular the cavity that the mold maker made in the die determines the shape of the finished first and second forged components.

The high quality of the hub according to the invention has been surprising. While hubs have been forged in the past these hubs required a great deal of finishing work. One of the causes of this is that forging had often been done manually. Also the requirements for precision and stability and weight were not as high as they are these days. This is why for many decades no hubs fit for series production have been forged for sports bicycles or competition bicycles. Namely, manual forging allows for economic manufacture only of a much limited precision.

A typical hub body may have a geometric shape that is formed by a central sleeve the ends of which are provided with a hub flange each. These hub flanges may extend over the entire circumference. By way of the hub according to the invention a hub is proposed in which the hub body consists for example of two forged components which are connected with one another. In this way it is possible to manufacture the two parts of the hub body by a forging process.

To this end a blank may for example be employed that is shaped chipless in particular by die forging preferably in one operation so as to create the first forged component. The second forged component may be manufactured by a corresponding further forging operation. The two forged components may be connected with one another to manufacture the hub body.

The two-part structure of the hub body structurally allows to manufacture each half by one single forging operation. Undercuts or the like are not necessary. Forging also allows economic production of "organic" shapes the manufacture of which by way of chip removal is complicated and can thus as a rule not be done economically. This allows new options in shaping and designing a hub. Aerodynamics can also be improved by way of design. The forging operation may require a number of steps.

Each forged component may comprise a tubular structure. The tubular structures of the forged components allow to provide the sleeve which connects the two ends of the hub body with one another.

Preferably the first and also the second forged component each comprise at least a plurality of fastening flanges for fastening spoke units.

Preferably at least one forged component comprises a plurality of fastening flanges protruding outwardly for fastening an integral multiple number of spoke units. It is for example possible that for each single spoke unit exactly one correspondingly small fastening flange extends radially outwardly from the tubular structure.

A spoke unit is preferably formed by at least one spoke nipple and a spoke. It is possible for both ends of the spoke to be provided with spoke nipples. It is also possible for one spoke end to comprise a thickened spoke head by means of which the spoke can be fixedly received in a corresponding receptacle. It is in particular also possible for the spoke unit to be received twist-proof where e.g. the spoke head is configured accordingly.

In this case it is preferred for the fastener or one spoke flange to be provided and configured for fastening a spoke or hub nipple or else for fastening a spoke head.

In this configuration the first forged component and the second forged component comprise fastening flanges for fastening spoke units.

Advantageously the first forged component and also the second forged component each comprise at least one bearing seat to rotatably support on the axle the respective forged component and the entire hub body.

To achieve high precision it is preferred that after the forging operation at least the bearing seats are finished by chip removal. It is also preferred for holes to be bored or grooves to be milled at the fastener to receive the spokes correspondingly. Another chip-removing finishing may be done on the inside face and in the joining area with the sleeve.

Separate finishing of the fasteners for the spokes to reduce weight is not necessary. In this way a very simple and efficient manufacturing process is provided on the whole with which to manufacture cost effective, high-quality, and lightweight hub bodies. Simultaneously high stressability of the hub body is enabled.

For axially fixing the bearings, each axially inwardly, the first forged component and/or the second forged component may each be provided with at least one bearing seat.

At least one forged component may comprise a disk brake accommodation at which a disk brake may be attached. The disk brake accommodation is also preferably generated by the forging operation. The contact surface of the brake disc may be stripped to ensure a planar contact surface.

The hub according to the invention may be configured as a front wheel hub or else as a rear wheel hub. Driven and non-driven variants are possible.

Preferably the sleeve is integrally formed with the first and/or the second forged component. Particularly preferably the first and/or the second forged component is/are tubular in structure serving in particular for fastening with the sleeve or the other forged component.

Preferably the sleeve comprises at least one slip-on portion. If the sleeve is provided as a separate part the sleeve may comprise at each of its ends a slip-on portion to be slipped onto an inserting portion of the first and/or the second tubular structure.

It is also possible for the sleeve to comprise at least one inserting portion. If the sleeve is again provided as a separate part, the sleeve may comprise at one or both of its ends an inserting portion to be inserted into a slip-on portion of the first and/or the second tubular structure.

If the sleeve is part of a forged component then the sleeve is virtually formed by a tubular structure of the first and/or the second forged component. For connecting the two forged components the other of the tubular structures is pushed into or onto the one of the tubular structures to connect the two forged components with one another.

The inserting portion and the slip-on portion are dimensioned such that the inserting portion can be inserted into the slip-on portion. This allows a particularly simple connection. The dimensions of the inserting portion and the slip-on portion allow a firm, reliable seat of the sleeve and the tubular structures upon one another. To support and guarantee the correct, snug mounting the angular alignment may be done by corresponding gluing gauges.

If both of the forged components are tubular in structure then preferably the tubular structure of the first forged component is shorter than the tubular structure of the second forged component. In particular is the tubular structure of the first forged component less than half the length of the tubular structure of the second forged component. This achieves high stability with a low weight. Furthermore, a new design results which due to intentional and e.g. contrasting coloring may result in entirely new options for optical designs. Moreover, advantages ensue regarding the mold and unit costs.

Particularly preferably the tubular structure and the sleeve or the two tubular structures overlap in an overlapping portion. The overlapping portion comprises at least one guiding portion and at least one gluing portion.

The guiding portion serves for defined assembly and guiding of the two forged components toward one another. The gluing portion is, however, preferably provided with at least one adhesive and serves to transmit the required adhesive capacity.

The gluing portion is preferably configured as a snug fit and particularly preferably the gluing portion is provided with at least one radial space between the first forged component and the second forged component at least in sections over the circumference. The radial space is preferably filled at least in part with at least one adhesive substance. Particularly preferably the radial space at the gluing portion is between 0.05 mm and 1 mm and in particular between 0.10 mm and 0.50 mm.

By way of combining the guiding portion with the gluing portion the overlapping portion enables a high-strength connection of the two forged components with one another or with the sleeve while by way of the guiding portion a precise, reproducible alignment of the first forged component with the second forged component is ensured.

The hub body according to the invention substantially consists of a first forged component and a second forged component, the first and the second forged components being connected with one another through a sleeve. It is possible for the first and the second forged components to comprise a tubular structure arranged at least partially inside one another to be fastened to one another.

The hub body according to the invention provides a very stress-tolerant hub body which has a low dead weight. Manufacturing is simple and cost effective such that higher stability can be achieved with a lower weight.

Another hub body according to the invention substantially consists of one single forged component comprising fasteners for spoke units at both ends. Preferably such a hub body is substantially tubular in design. The applicant reserves the right to claim these hub bodies separately.

In all the configurations the ratio of the maximum outer diameter to the minimum inner diameter is preferably between 1.25 and 2, in particular between 1.4 and 1.85. If a disk brake accommodation is provided, then the ratio is preferably between 1.7 and 2.0. Absent a disk brake accommodation, the ratio is preferably between 1.3 and 1.7. The maximum outer diameter is measured over the fasteners. On the whole, a slim, tubular hub body is provided.

The method according to the invention serves to manufacture a hub with a hub body and with an axle and at least one bearing for rotatably supporting the hub body wherein for manufacturing the hub body a first forged component is formed from a first blank by way of die forging. A second forged component is formed from a second blank by way of die forging. The two forged components are connected with one another through a sleeve. In this method by way of die-forging at least one forged component is provided with a plurality of fastening flanges protruding outwardly for fastening spoke units.

It is possible for the first and the second tubular structure to be at least partially pushed into one another for fastening. It is also possible for the first tubular structure and the second tubular structure to be screwed with one another. A precise angular alignment of the two parts may be ensured by precise manufacture and/or by a displaceable stopper and/or gluing the screw-thread in the snug fit.

It is in particular also possible for the first forged component and the second forged component to be glued with one another for manufacturing the hub body.

On the whole the invention provides an advantageous hub and an advantageous hub body which are cost effective in manufacture and which combine high stability with a low weight. Extensive chip-removing finishing for reducing weight is not necessary.

BRIEF DESCRIPTION OF THE DRAWINGS

Further advantages and features of the present invention can be taken from the exemplary embodiments which will be discussed below with reference to the enclosed figures.

The drawings show in.

DETAILED DESCRIPTION

With reference to the enclosed figures exemplary embodiments of hubs 1 according to the invention will be discussed below.

Figure 1:
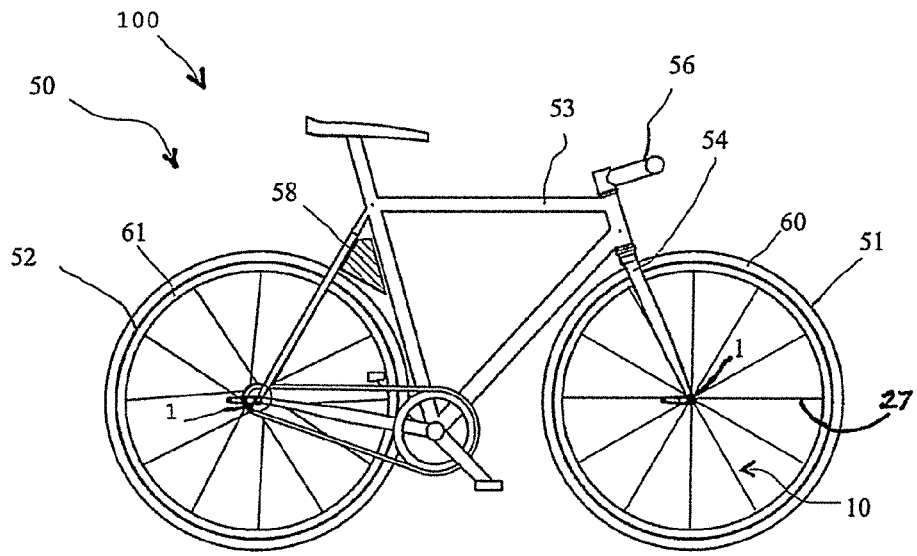
FIG. 1 a first bicycle with hubs according to the invention in a side view.

In FIG. 1 a vehicle 100 configured as a two-wheeled vehicle 50 and in particular as a racing bicycle is illustrated in a schematic side view. The bicycle 50 is muscle-powered at least in part and may be provided with an electric auxiliary drive.

The racing bicycle is illustrated in a simplistic side view and comprises a front wheel 51 and a rear wheel 52 and a frame 53. A handlebar 56 serves as a control and may have different configurations.

Beneath the saddle 57 a battery 58 may be provided which is employed in particular for electro-assisted two-wheeled vehicles. Generally speaking, such a battery 58 may be attached to the frame in other places or incorporated into the frame or attached elsewhere.

In the bicycle according to FIG. 1 the tire 60 may be configured as a tubeless tire and for example be glued onto the rim 61. The rims 61 of the front wheel 51 and the rear wheel 52 are each connected with the hub via spoke units 10 with spokes 27.

The rear wheel 52 is provided with a hub 1 according to the invention as the rear wheel hub 3 while the front wheel is equipped with a front wheel hub 4.

Figure 2:
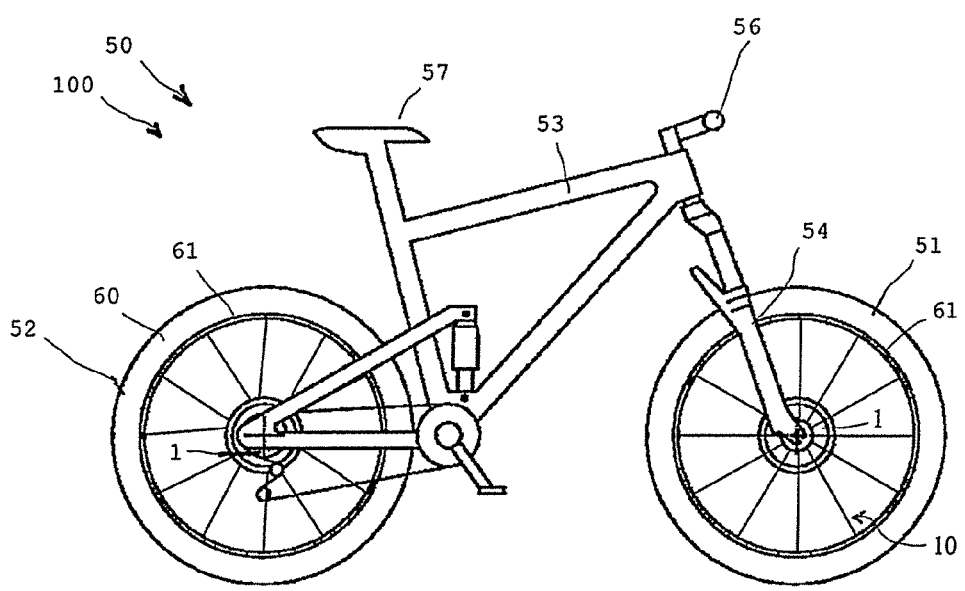
FIG. 2 a mountain bike with hubs according to the invention in a side view.

In FIG. 2 a mountain bike bicycle 50 is illustrated in a simplistic side view comprising a front wheel 51 and a rear wheel 52, a frame 53, a sprung front fork 54 and a rear wheel damper 54. In this exemplary embodiment, disk brakes are provided. The rear wheel 52 is provided with a hub 1 according to the invention as the rear wheel hub 3 and the front wheel 51 is provided with a front wheel hub 4 as the hub 1.

Figure 3:
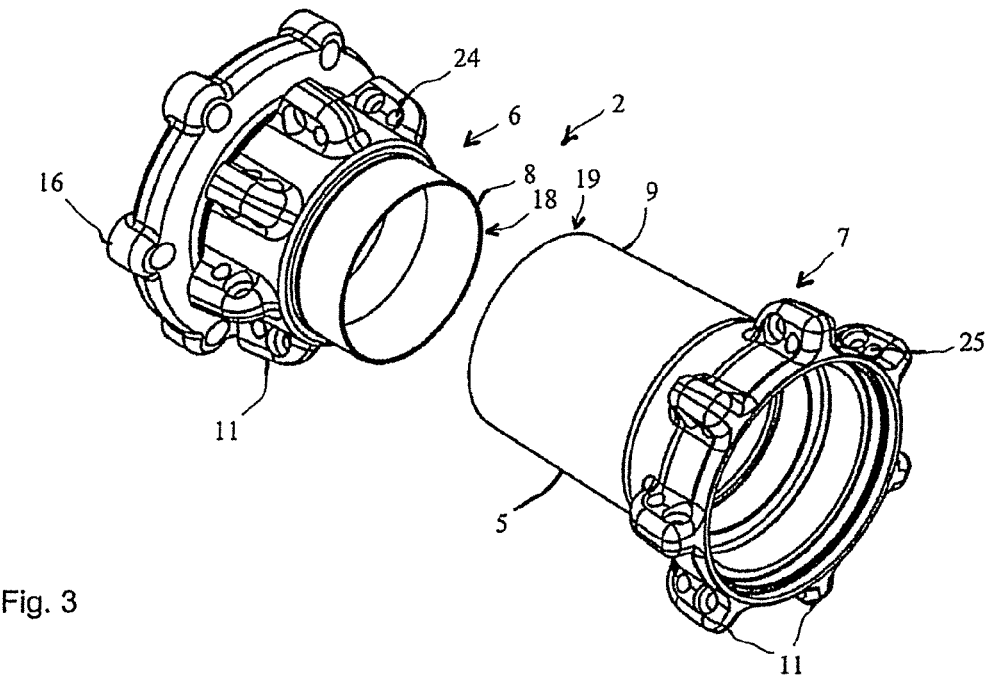
FIG. 3 a first perspective illustration of the forged components of a hub according to the invention.

FIG. 3 shows a perspective view of the hub body 2 of a hub of the bicycle according to FIG. 1 or 2.

The hub body 2 consists of a first forged component 6 and a second forged component 7. The forged component 6 presently comprises a tubular structure 8 and the forged component 7 comprises a tubular structure 9. The tubular structures 8 and 9 comprise cylindrical or at least approximately cylindrical portions with the cylindrical portion at the tubular structure 8 showing less than half the length of the cylindrical region at the tubular structure 9.

The tubular structures 8 and 9 form a sleeve 5 via which the two forged components are connected with one another.

Both the first forged component 6 and the second forged component 7 comprise fastening means for spoke units 10. It is possible for hub nipples to be disposed at the forged components 6, 7. Or else it is possible for spoke heads of spokes 27 of the spoke units 10 to be fastened to the fastener 24 or fastener 25.

The fasteners 24 and 25 are presently configured as separate fastening flanges presently extending approximately radially outwardly from the first forged component 6 or the second forged component 7. It is also possible for the fasteners 24 and 25 to be configured as circumferential hub flanges.

For fastening the two tubular structures 8 and 9 with one another the first forged component 6 comprises at the tubular structure 8 an inserting portion 18 which is inserted in a slip-on portion 19 of the tubular structure 9.

The forged component 6 comprises in the present exemplary embodiment a disk brake accommodation 16 to which a disk brake can be screwed.

Figure 4:
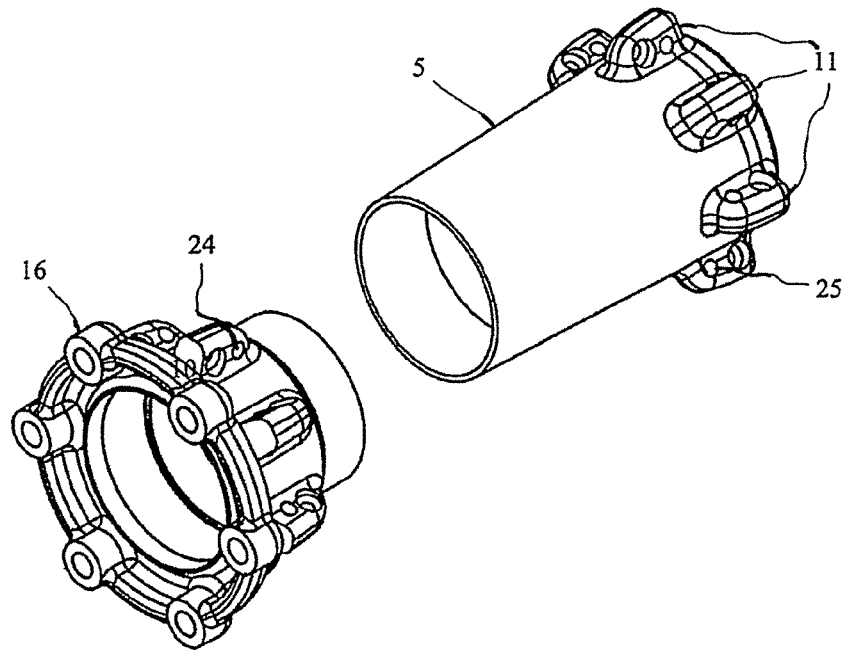
FIG. 4 another perspective illustration of the forged components of the hub according to the invention according to FIG. 3.

FIG. 4 shows another perspective view of the hub body 2 according to FIG. 3, presently showing the axial configuration of the fastening flanges 11 on the first and the second forged components 6, 7. This configuration allows to manufacture in a simple way, beginning from a for example annular blank, the entire first forged component 6 and/or the second forged component 7 by way of a forging operation. The forging operation creates a high-strength structure so as to enable comparatively thin wall thicknesses.

Figure 5:
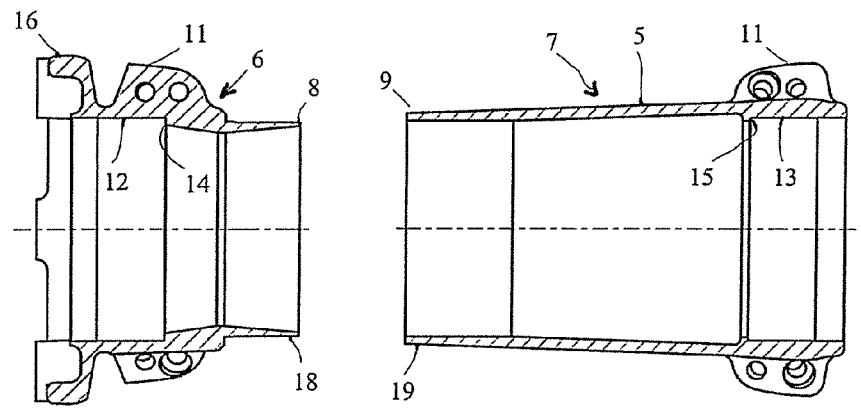
FIG. 5 a cross-section of the two forged components of the hub according to FIG. 3.

FIG. 5 shows a cross-section of the first forged component 6 and the second forged component 7 with the two forged components 6 and 7 disposed spaced apart from one another. This is for example the situation shortly prior to mounting. The fastening flanges 11 comprise holes for receiving the spokes which have been inserted after forging. In the interior of the forged components 6 and 7 bearing seats 12 and 13 are provided.

A shoulder 14 in the first forged component 6 serves to axially fix the bearing 4 at the bearing seat 12.

The shoulder 15 in the second forged component 7 serves to axially fix the bearing 4 at the bearing seat 13.

Figure 6:
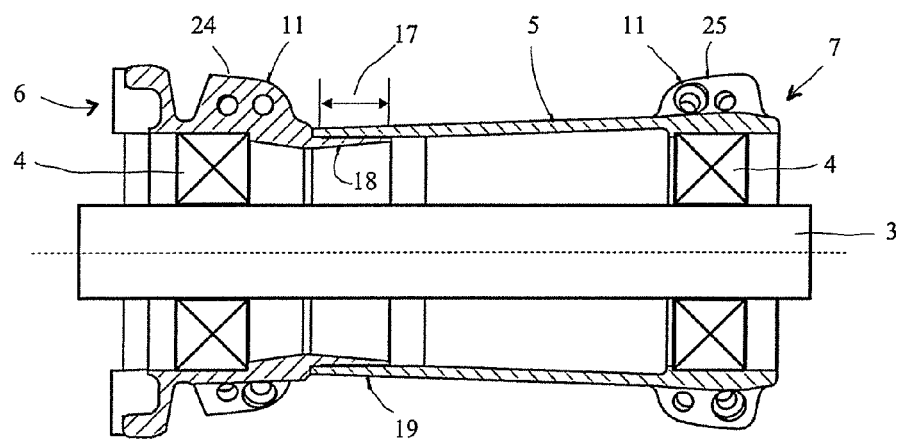
FIG. 6 the assembled hub body according to FIG. 5.

FIG. 6 shows the assembled state with simplistic bearings 4 and axle 3 drawn in.

The presently continuous axle 3 may be configured as a hollow axle or else as a solid axle.

It can clearly be seen that the first forged component 6 and the second forged component 7 overlap in the overlapping region 17. In this region the inserting portion 18 of the first forged component 6 is inserted in the slip-on portion 19 of the second forged component such that a firm connection of the first and the second forged components 6, 7 is present.

Figure 7:
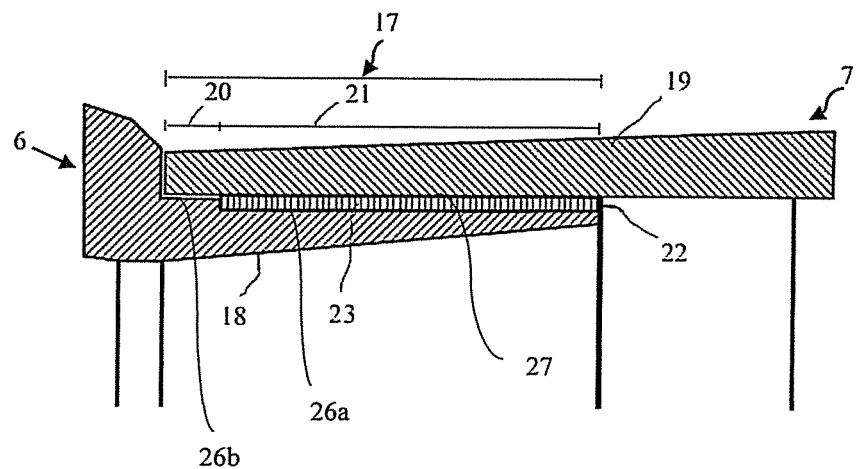
FIG. 7 an enlarged, schematic illustration of the overlapping region of the two forged components of the hub body according to FIG. 5.

FIG. 7 shows in an enlarged illustration the overlapping region 17 with the first forged component 6 and the second forged component 7. The overlapping region 17 extends over a certain axial length composed of the guiding portion 20 and the gluing portion 21 where the gluing portion extends axially inwardly from the guiding portion.

In other configurations it is also possible that two or more guiding portions and two or more gluing portions are provided. It is for example possible to provide two guiding and two gluing portions or two guiding and one gluing portion alternatingly.

The guiding portion 20 is configured as a snug fit so as to align the two forged components 6 and 7 toward one another in a snug fit. Specifically, the guiding portion 20 has a first outer diameter 26a and a second outer diameter 26b where the second outer diameter 26b of the first forged component 6 and the inner diameter 27 of second forged component 7 are approximately equal to each other to provide the snug fit therebetween.

In the gluing portion 21 a radial space 22 is provided between the first outer diameter 26a of the inserting portion 18 and the inner diameter 27 of the slip-on portion 19. This radial space 22 is presently filled by a gluing substance 23 which is applied prior to connecting the two forged components 6 and 7. After the gluing substance 23, which may consist of one or more adhesives, has set, a firm connection of the two forged components 6 and 7 is provided ensuring a permanently secure connection. Due to the comparatively small radial gap 22, high gluing strength and a reliable seat are achieved.

Figure 8:
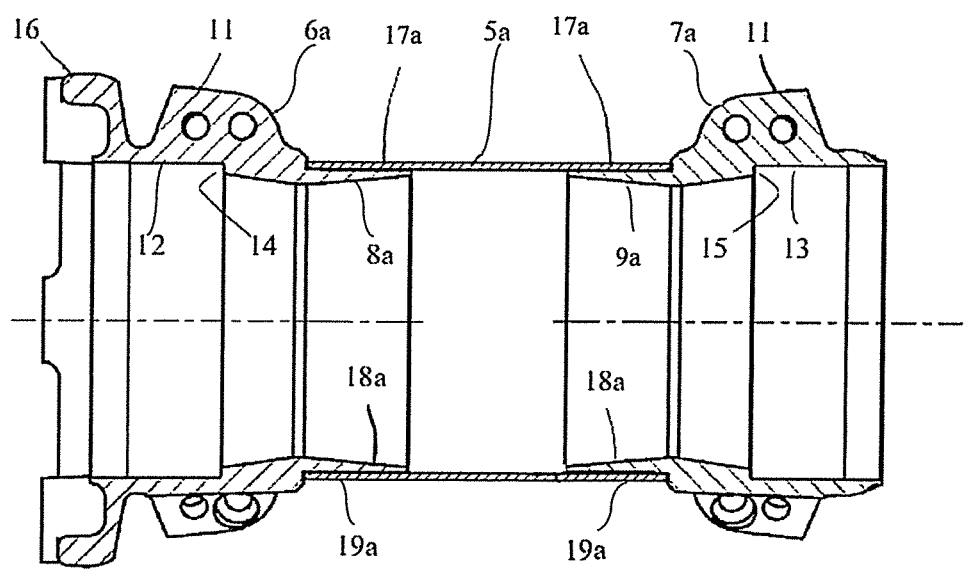
FIG. 8 another hub body in a sectional view.

FIG. 8 shows another variant of a hub body 2 which is presently configured tripartite. The first forged component 6a and the second forged component 7a are connected with one another via a presently separate sleeve 5a. Presently both ends of the sleeve 5a comprise slip-on portions 19a while the tubular structures 8a and 9a of the forged components 6a and 7a comprise inserting portions 18a. This results in overlapping portions 17a at both ends of the sleeve 5a.

The separate sleeve may consist of a light metal or else of a fibrous composite material.

It is also possible for the hub body 2 to consist substantially and in particular entirely of one single forged component which comprises at both ends fasteners for spoke units. The fasteners may be configured at circumferential spoke flanges or else be configured as illustrated in the figures.

By way of the invention a robust and lightweight hub is provided which is simple to manufacture and only requires little finishing work. This allows to manufacture a very high-quality hub more cost effectively than thus far while stability concurrently increases.

A disk brake accommodation 16 may be incorporated into the hub. It is also possible to provide one disk brake accommodation 16 each at both of the axial ends. The diameter in the region of the fasteners for the spoke units can be kept small which provides weight advantages. Due to this and also due to the tubular structure the costs for the required mold can be kept low.

In the case of two non-symmetrical forged components, there are advantages in terms of strength, costs for the required mold, and in design.

It is another considerable advantage that the hub is compatible with spokes having no hub-end screw thread. The fasteners 24, 25 do not have to be internally threaded for fastening the spoke ends thereto. Hub nipples may—though do not have to—be employed. Basically conventional spokes with elbowed heads can be employed.

By way of an overlapping portion 17 with a guiding portion 20 and a gluing portion 21, a hub is provided that can be mounted with precision and ease.

The invention claimed is:

1. A hub for at least partially muscle-powered vehicles, comprising: a hub body having an axle and at least one bearing for rotatably supporting the hub body, the hub body has a first forged component and at least one second forged component wherein each of said first and second forged components includes a fastening flange portion and a tubular structure axially extending from said fastening flange portion, and a plurality of fastening flanges protruding outwardly from said fastening flange portion for fastening spoke units, wherein said tubular structure of said second forged component overlaps at least a portion of said tubular structure of said first forged component in at least one overlapping portion to connect said first and second forged components together, the at least one overlapping portion including at least one guiding portion and at least one gluing portion extending axially inwardly from said at least one guiding portion, said at least one guiding portion configured for guiding the tubular structures of said first and second forged components toward each other and into engagement with each other and said gluing portion being at least one radial space formed between the tubular structures of said first and second forged components, said at least one radial space configured to receive adhesive for securing the tubular structures of the first and second forged components together.

2. The hub according to claim 1 wherein at least one of the first and the second forged component comprises at least one bearing seat including a shoulder for axially fixing the bearing.

3. The hub according to claim 1 wherein at least one of the first and the second forged component comprises a disk brake accommodation.

4. The hub according to claim 1 wherein the tubular structure of the first forged component is less than half the length of the tubular structure of the second forged component.

5. The hub according to claim 1 wherein the guiding portion is configured as a snug fit.

6. A method of manufacturing a hub having a hub body and with an axle and at least one bearing for rotatably supporting the hub body wherein for manufacturing the hub body a first forged component is formed from a first blank by die forging and wherein a second forged component is formed from a second blank by die forging wherein the first and second forged components each include a fastening flange portion and a tubular structure axially from said fastening flange portion, said tubular structure of said first forged component being an inserting portion including a first outer diameter and a second outer diameter, and said tubular structure of said second forged component being a slip-on portion including an inner diameter, wherein said inner diameter of said slip-on portion is greater than said first outer diameter of said inserting portion forming a radial space therebetween, and said inner diameter of said slip-on portion and said second outer diameter of said inserting portion are approximately equal to form a snug fit therebetween, such that the first and second forged components are connected together by interconnecting the tubular structures of the first and second forged components by both inserting glue in the radial space between the tubular structures and forming the snug fit between the tubular structures, wherein by way of die-forging at least one of said first and second forged components is provided with a plurality of fastening flanges protruding outwardly from the flange fastening portions for fastening spoke units.

7. A hub for at least partially muscle-powered vehicles, comprising: a hub body having an axle and at least one bearing for rotatably supporting the hub body, the hub body has a first forged component and a second forged component, wherein one of the first and second forged components includes a first fastening flange portion and a slip-on portion extending from said first fastening flange portion, said slip-on portion having an inner diameter, and the other one of the first and second forged components includes a second fastening flange portion and an inserting portion extending from said second fastening flange portion, said inserting portion having a first outer diameter and a second outer diameter, wherein said slip-on portion at least partially overlaps said inserting portion in an overlapping region, wherein said inner diameter of said slip-on portion is greater than said first outer diameter of said inserting portion to form a radial space between the first and second forged components that is configured for receiving adhesive, and said inner diameter of said slip-on portion is approximately equal to said second outer diameter of said inserting portion to provide a snug fit.

* * * * *